Oct. 17, 1967  F. HAUCK  3,347,093
APPARATUS FOR TESTING FUEL INJECTION PUMPS
Filed Jan. 22, 1965  2 Sheets-Sheet 2

INVENTOR
Franz Hauck 3,347,093
APPARATUS FOR TESTING FUEL INJECTION PUMPS
Franz Hauck, Denkendorf, Kreis Esslingen, Germany, assignor to Robert Bosch GmbH, Stuttgart, Germany
Filed Jan. 22, 1965, Ser. No. 427,434
Claims priority, application Germany, Feb. 1, 1964, B 75,270
7 Claims. (Cl. 73—168)

The present invention relates to an apparatus for testing fuel injection pumps of automotive vehicles and the like. More particularly, the invention relates to improvements in apparatus of the type wherein fuel injection pumps and other types of fluid displacing machines may be tested with a hydraulic fluid to determine the rate of fuel flow, the operation of valves, the start of the effective operation and certain other functions.

It is well known that a testing operation will produce more accurate results if the temperature of testing fluid remains constant during the entire testing operation. Heretofore proposed testing apparatus for fuel injection pumps and the like normally comprise a pump which is installed in the tank for testing fluid and serves to agitate such fluid. The fluid is conveyed to the machine to be tested and is simultaneously heated by an electric heater or by exchanging heat with hot water. Such testing apparatus are rather complicated and expensive, not only because they must be provided with a separate pump to agitate testing fluid in the tank but also because the heating device or devices require separate wiring or conduits and consume substantial amounts of energy.

Accordingly, it is an important object of the present invention to provide a novel testing apparatus for fuel injection pumps and other types of pumps, and to construct the apparatus in such a way that the testing fluid need not be agitated by a specially provided pump and that the testing fluid may be heated in an exceptionally simple, inexpensive and easily controllable manner.

Another object of the invention is to provide a testing apparatus of the just outlined characteristics wherein the temperature of testing fluid may be raised and regulated by means of simple, rugged and readily adjustable devices which need not be connected to a source of electrical or other energy.

A further object of the invention is to provide a testing apparatus which may be rapidly adjusted to test different phases in the operation of a fuel injection pump, which can be used in testing of different types of pumps, and wherein a single motor suffices to operate all movable parts serving to circulate the testing fluid through the conduits of the apparatus, through a pump which is to be tested, and back to the source of testing fluid. A concomitant object of the invention is to provide a novel heating device which may be utilized in a testing apparatus for fuel injection pumps and the like.

Still another object of the invention is to provide a novel control valve which may be utilized in the improved testing apparatus to regulate the pressure of testing fluid.

Another object of the invention is to provide a novel method of heating testing fluid in an apparatus of the above outline characteristics.

Briefly stated, one feature of my invention resides in the provision of a testing apparatus which comprises a source of testing fluid, supply conduit means connecting the source with a fuel injection pump or another fluid displacing machine to be tested, circulating pump means for conveying the fluid from the source to the pump, and at least one adjustable throttle valve in the supply conduit means. The valve defines a flow restricting passage with resultant heating of the fluid.

The circulating means preferably comprises a constant delivery pump which is installed in the supply conduit means upstream of the throttle valve. Any surplus of testing fluid which passes the flow restricting passage is returned to the source through one or more valved return conduits which communicate with the supply conduit means downstream of the throttle valve.

Basically, the method of my invention comprises the steps of conveying a hydraulic testing fluid at a predetermined rate in an elongated path, and restricting a portion of the path to generate turbulence in and to thereby heat the fluid.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of a specific embodiment with reference to the accompanying drawings, in which:

Figure 1:
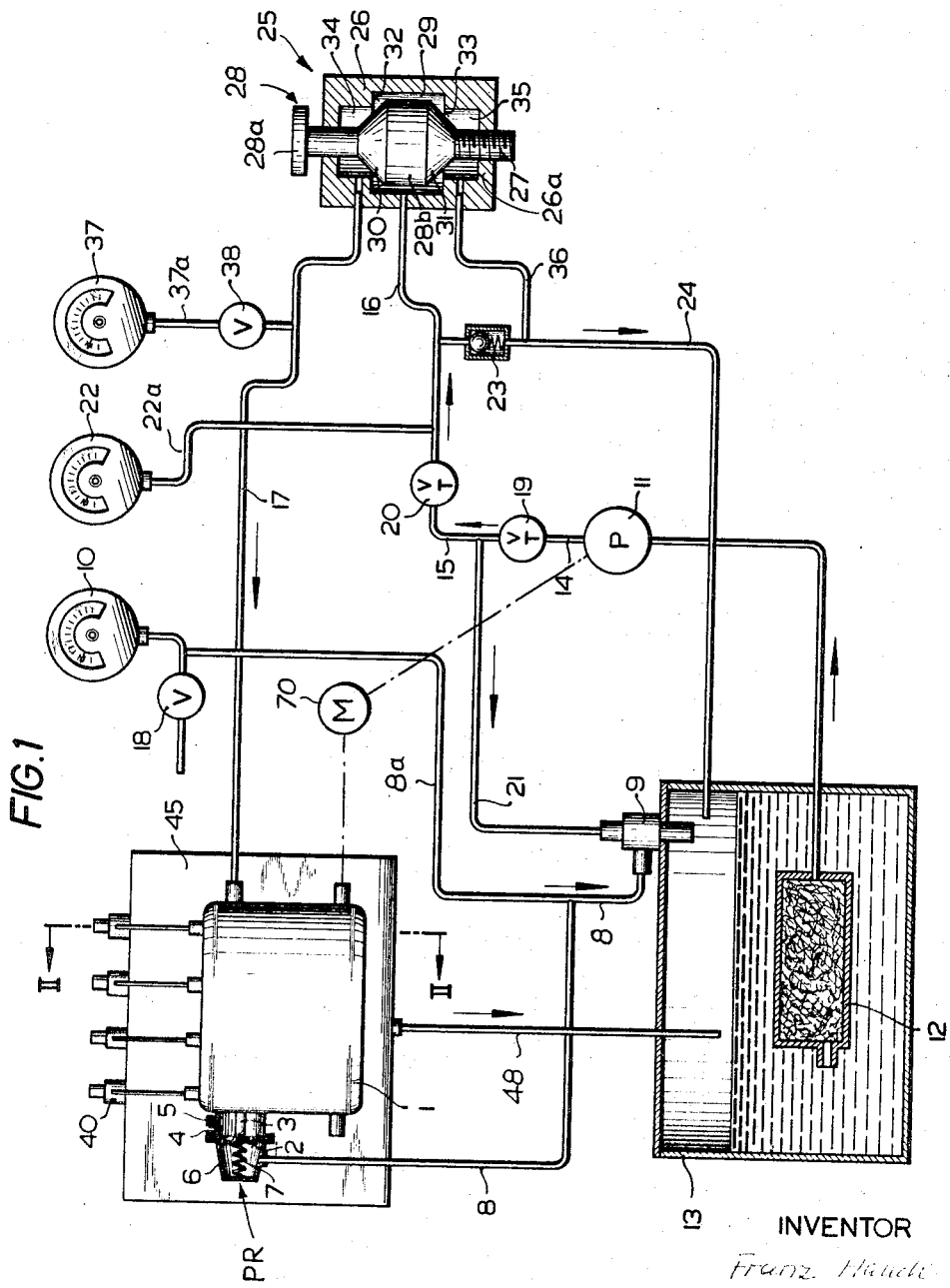
FIG. 1 is a diagram showing a testing apparatus which is constructed in accordance with my invention and a fuel injection pump for automotive vehicles which is connected with the testing apparatus.

Referring to the drawings the numeral 1 denotes a fuel injector pump which is of the multiple-unit type. The pump 1 is driven by a suitable motor 70 which forms part of the testing apparatus. A pneumatic regulator PR is mounted on the pump 1 and comprises a diaphragm 2 which is connected to an adjusting member 3, the latter serving to regulate the quantity of fuel that is conveyed by the pump 1.

The diaphragm 2 divides the interior of the regulator housing into a first chamber 4 which communicates with the atmosphere through a port 5, and into a second chamber 6 which accommodates a helical return spring 7. The chamber 6 is maintained at subatmospheric pressure and the spring 7 serves to bias the diaphragm 2 to its normal position.

The chamber 6 is connected to a conduit 8 which leads to a jet pump 9. The conduit 8 is further connected with a pressure gauge 10 which furnishes readings indicative of the subatmospheric pressure prevailing in the chamber 6. A branch conduit 8a which leads to the gauge 10 is connected with a shutoff valve 18 which is used to adjust the pressure in the chamber 6 by admitting atmospheric air.

A circulating pump 11 is driven by the afore-mentioned motor 70 of the testing apparatus and serves to draw testing fluid from a source here shown as a tank 13. The fluid is drawn through a filter 12 and is conveyed through supply conduits 14, 15, 16, 17 on to the fuel injection pump 1. The circulating pump 11 delivers predetermined quantities of testing fluid per unit of time and such fluid passes through an adjustable throttle valve 19 which is installed between the supply conduits 14, 15. The valve 19 raises the pressure and hence the temperature of testing fluid which is then conveyed through a second adjustable throttle valve 20 mounted between the supply conduits 15, 16.

The supply conduit 15 connects to a branch conduit 21 which leads to the jet pump 9, the latter serving to reduce the pressure in the chamber 6. The throttle valves 19, 20 are of the type being infinitely adjustable between a minimum and maximum value so that each thereof may regulate the cross-sectional area of the restricting passage for testing fluid within a predetermined range and to select and desired cross-sectional area within such range.

The supply conduit 16 is connected with a branch conduit 22a leading to a temperature measuring and indicating gauge 22. This supply conduit 16 is further connected with a return conduit 24 which discharges into the tank 13 and contains a relief valve here shown as a spring-biased one-way ball valve 23.

The supply conduits 16, 17 are connected by a pressure adjusting valve 25, hereinafter called control valve, which serves as a pressure selecting and flow dividing means. The control valve 25 comprises a housing or cylinder 26 which accommodates a reciprocable valve member or piston 28. The latter includes a threaded stem 27 which meshes with one end wall 26a of the cylinder 26 and a knob 28a which can be grasped by fingers when the operator desires to carry out an adjustment. The supply conduit 16 discharges into a centrally located annular groove 29 of the cylinder 26 which surrounds with clearance a cyindrical central portion 28b of the valve member 28. This valve member is provided with two conical portions 30, 31 which are disposed at the opposite ends of the cylindrical central portion 28b and may be moved into or out of sealing engagement with annular seats 32, 33 defined by the cylinder 26 at the axial ends of the groove 29.

The conical portions 30, 31 and the corresponding seats 32. 33 define between themselves two annular flow restricting gaps whose cross-sectional area may be varied in response to axial adjustment of the valve member 28 whereby the area of one gap increases when the area of the other gap decreases, or vice versa.

The supply conduit 17 is connected to a first annular compartment 34 which is separated from the groove 29 by the seat 32. The seat 33 separates the groove 29 from a second annular compartment 35 which communicates with a return conduit 36 connected to the return conduit 24 at a point located downstream of the relief valve 23. Thus, testing fluid entering the compartment 35 is free to return into the tank 13.

The supply conduit 17 is also connected with a branch conduit 37a which contains an adjustable safety valve 38 and leads to a pressure gauge 37. The valve 38 closes automatically in response to a predetermined maximum pressure of testing fluid to protect the mechanism of the gauge 37.

Figure 2:
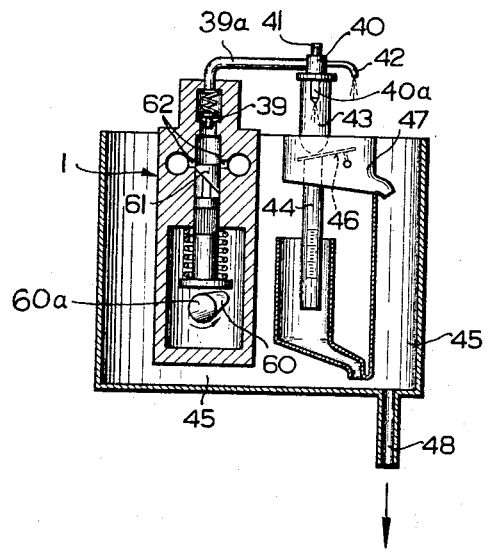
FIG. 2 is a vertical section through the fuel injection pump and through certain component parts of the testing apparatus, substantially as seen in the direction of arrows from the line II—II of FIG. 1.

The pump 1 comprises a series of outlets each of which contains a spring-biased fuel-discharging valve 39. When the pump 1 is being tested, the valves 39 are connected with injector valves or spray valves 40 one of which is shown in FIG. 2. Each spray valve 40 is provided with a bypass valve 41 and an evacuating tube 42.

The testing fluid which issues from the nozzles 40a of spray valves 40 is intercepted in collecting tubes 43 of vitreous material which direct streams of such testing fluid into measuring tubes or test tubes 44 provided with graduations to indicate the quantity of accumulated testing fluid. When the testing operation is completed, the contents of the tubes 44 may be discharged into a receptacle 45 whence the fluid returns into the tank 13 via conduit 48.

In order to make sure that the test tubes 44 receive only such testing fluid which has been discharged from the pump 1 in response to a predetermined number of revolutions or within a predetermined time interval, the testing apparatus comprises a baffle plate 46 which may be shifted to and from the position shown in FIG. 2 so that it may deflect the fluid streams issuing from the tubes 43 and then directs such fluid into a container 47 whose spout discharges into the receptacle 45, i.e., the fluid which is deflected by the baffle plate 46 bypasses the test tubes 44 and returns directly into the tank 13 via receptacle 45 and conduit 48.

The apparatus is operated as follows:

Prior to actual start of a testing operation, the fluid must be heated to a predetermined temperature which should remain constant. Such heating is effected by starting the circulating pump 11 which draws fluid from the tank 13 and delivers it through supply conduits 14–16 and throttle valve 19. The valve member 28 of the control valve 25 is then adjusted in such a way that the testing fluid delivered by the supply conduit 16 flows through the groove 29, compartment 35 and return conduits 36, 24 back to the tank 13, i.e., the conical portion 30 of the valve member 28 then abuts against the seat 32. In the first stage of such operation, the valve 19 is adjusted to produce a very strong throttling action with resultant rapid heating of the fluid, the exact temperature of the fluid being indicated by the pointer of the gauge 22. The valve 19 is adjusted to permit increased flow of testing fluid as soon as the gauge 22 indicates that the entire body of fluid has been heated to desired temperature, and the adjustment of the valve 19 is then selected in such a way that the temperature of thus heated testing fluid remains substantially constant.

In order to test the start of the effective operation of the injection pump 1, the operator adjusts the valve member 28 in such a way that the fluid passing into the supply conduit 17 is subjected to a pressure which is high enough to open the valves 39. The bypass valves 41 are opened so that all of the testing fluid entering the conduits 39a (see FIG. 2) can flow through the evacuating tubes 42 and directly into the container 47, i.e., such fluid bypasses the tubes 43, 44.

The start of the effective operation is determined by gradually turning the camshaft 60a (see FIG. 2) with the cams 60 in a counterclockwise direction until the plungers 61 seal the outlets of suction ducts 62. As soon as the outlets of the ducts 62 are sealed, the testing fluid ceases to flow through the valves 39, i.e., the tubes 42 cease to deliver such fluid into the container 47. Such position of the camshaft 60a is memorized on a nonillustrated scale of the testing apparatus and marks the start of the effective operation of the injection pump. In the above described stage of the testing operation, the apparatus has also tested the valves 39, i.e., the pressure which is needed to overcome the bias of springs which normally keep the valves 39 closed.

In the next-following stage, the pump 1 is tested to determine the quantity of fluid which is fed through the valves 39 per revolution or per unit of time. During this stage, the camshaft 60a is driven at a predetermined speed so that the cams 60 complete a desired number of revolutions. The valves 40 then discharge into the tubes 43, i.e., the evacuating tubes 42 must be sealed in response to closing of bypass valves 41. The control valve 25 is also adjusted so that the supply conudit 17 delivers testing fluid at a predetermined pressure, e.g., in the range of 1 atmosphere overpressure.

The fluid which is discharged by the pump 1 during a predetermined number of revolutions of the camshaft 60a flows into the tubes 43 and from there into the test tubes 44. Upon determination of fluid quantity in the test tubes 44, the tubes 44 are evacuated by dumping the fluid into the receptacle 45 whence it flows via conduit 48 and back to the tank 13.

The circulating pump 11 is of the constant delivery type which feeds into the throttle valve 19 an unchanging quantity of testing fluid per unit of time. Surplus testing fluid is returned to the suction side of the pump 11 (i.e., into the tank 13) by flowing through the return conduit 24 and relief valve 23 and/or via return conduits 36, 24. In order to heat the testing fluid to desired temperature, the circulating pump 11 must generate a pressure which is so high that the pump 11 by itself suffices to circulate testing fluid at pressures required for testing the start of the effective operation of fuel injection pumps and in amounts required for testing the quantity of fuel passing through an operating injection pump. In heretofore known testing apparatus, a first pump serves to produce high pressures necessary for testing the start of the effective operation of the injection pump and a second pump serves to produce low pressures which are needed for testing the normal operation of an injection pump. The circulating pump 11 also replaces conventional pumps which are used to agitate testing fluid in the tank.

The valve 19 will cause a turbulent flow and resultant heating of testing fluid, and such heating action is improved if the throat of the valve 19 is adjusted so as to reduce the cross-sectional area of the passage for testing fluid.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. An apparatus for testing fluid displacing machines, particularly for testing the start of the effective operation of fuel injection pumps and the quantity of fuel passing through operating fuel injection pumps, comprising a source of testing fluid; supply conduit means connecting said source with a machine to be tested; circulating means provided in said supply conduit means for conveying the fluid from said source to the machine at a pressure which is so high that said circulating means by itself suffices to circulate the testing fluid at pressures required for testing the start of the effective operation of a fuel injection pump and in amounts required for testing the quantity of fuel passing through an operating fuel injection pump; and heating means including adjustable throttle valve means provided in said conduit means and defining a flow restricting passage for causing turbulent flow of testing fluid whereby such fluid is heated.

2. An apparatus for testing fuel injection pumps and other types of fluid displacing machines, comprising a source of testing fluid; supply conduit means for connecting said source with the machine to be tested; circulating means provided in said supply conduit means for conveying the fluid from said source to the machine; heating means including a first adjustable throttle valve provided in said supply conduit means downstream of said circulating means and defining a restricting passage for testing fluid whereby such fluid is heated; a second throttle valve provided in said supply conduit means downstream of said first throttle valve; a suction generating pump discharging into said source; and a branch conduit connecting said suction generating pump with said supply conduit means intermediate said first and second throttle valves.

3. An apparatus for testing fuel injection pumps and other types of fluid displacing machines, comprising a source of testing fluid; supply conduit means for connecting said source with the machine to be tested; circulating means provided in said supply conduit means for conveying the fluid from said source to the machine; heating means including a first adjustable throttle valve provided in said supply conduit means downstream of said circulating means; and a second adjustable throttle valve provided in said supply conduit means downstream of said first valve, said first valve defining a restricting passage for testing fluid whereby such fluid is heated, the cross-sectional area of each passage of said valves being infinitely adjustable between a minimum and maximum value.

4. An apparatus for testing fuel injection pumps and other types of fluid displacing machines, comprising a source of testing fluid; supply conduit means connecting said source with a machine to be tested; circulating means provided in said supply conduit means for conveying the fluid from said source to the machine; heating means including a plurality of adjustable throttle valves provided in said supply conduit means, each of said valves defining a flow restricting passage for testing fluid whereby such fluid is heated; and pressure gauge means connected with said supply conduit means downstream of said heating means.

5. An apparatus for testing various phases in the operation of fuel injection pumps for automotive vehicles and other types of fluid displacing machines by means of a hydraulic testing fluid, comprising a source of testing fluid; supply conduit means connecting said source with the machine to be tested; a constant-delivery circulating pump provided in said supply conduit means for conveying the fluid from said source to the machine; at least one adjustable throttle valve provided in said supply conduit means downstream of said circulating pump for heating the fluid; a first return conduit connecting said source with said supply conduit means downstream of said throttle valve; a control valve provided in said supply conduit means downstream of said return conduit for regulating the pressure and for dividing the flow of testing fluid; a second return conduit connected with said control valve for returning surplus testing fluid to said source; temperature measuring means connected with said supply conduit means downstream of said throttle valve; and pressure measuring means connected with said supply conduit means downstream of said control valve.

6. An apparatus for testing various phases in the operation of fuel injection pumps for automotive vehicles and other types of fluid displacing machines by means of a hydraulic testing fluid, comprising a source of testing fluid; supply conduit means connecting said source with the machine to be tested; a constant-delivery circulating pump provided in said supply conduit means for conveying the fluid from said source to the machine; a pair of adjustable throttle valves provided in said supply conduit means downstream of said circulating pump, the first of said valves being provided for heating the fluid; a first return conduit connecting said source with said supply conduit means downstream of said throttle valves; a control valve provided in said supply conduit means downstream of said return conduit for regulating the pressure and for dividing the flow of testing fluid; a second return conduit connected with said control valve for returning surplus testing fluid to said source; temperature measuring means connected with said supply conduit means downstream of said throttle valves; pressure measuring means connected with said supply conduit means downstream of said control valve; a suction generating pump discharging into said source; and a branch conduit connecting said suction generating pump with said supply conduit means intermediate said throttle valves.

7. Apparatus for testing fuel injection pumps and other types of fluid displacing machines, comprising a source of testing fluid; supply conduit means connecting said source with a machine to be tested and including a first and a second supply conduit, said second supply conduit being adapted to convey testing fluid to the machine; circulating means provided in said supply conduit means for conveying the fluid from said source to the machine; heating means including adjustable throttle valve means provided in said first supply conduit and defining a flow restricting passage for testing fluid whereby such fluid is heated; control valve means provided in said supply conduit means downstream of said heating means for regulating the pressure of testing fluid which is conveyed on to the machine, said control valve means comprising a hollow housing connected with said first and second supply conduits, a return conduit connecting said housing with said source, and an adjustable valve member provided in said housing for regulating the flow of testing fluid from said first supply conduit to said second supply conduit, any surplus of testing fluid being admitted to said return conduit, said housing defining an annular groove communicating with said first supply conduit, first and second annular compartments respectively communicating with said second supply conduit and said return conduit, and first and second annular valve seats respectively disposed between said groove and said first and second compartments, said valve member being adjustable axially of said housing and comprising a central portion received with clearance in said groove, a first conical portion cooperating with said first valve seat to regulate the flow of testing fluid from said groove into said first compartment, and a second conical portion cooperating with said second valve seat to regulate the flow of testing fluid from said groove into said second compartment.

References Cited

UNITED STATES PATENTS

| 2,790,463 | 4/1957 | Delano et al. | 138—44 |
| 2,936,788 | 5/1960 | Dahl et al. | 138—45 |

FOREIGN PATENTS

| 768,292 | 2/1957 | Great Britain. |
| 770,452 | 3/1957 | Great Britain. |

OTHER REFERENCES

George Nankervis Co., Bulletin N. 1382, Nankervis Model 19500, 2 p.

LOUIS R. PRINCE, *Primary Examiner.*

J. NOLTON, *Assistant Examiner.*